United States Patent [19]

Vingerling

[11] Patent Number: 4,658,113

[45] Date of Patent: Apr. 14, 1987

[54] DEVICE AND METHOD FOR PROTECTING OPTICAL MEANS FROM CONTAMINATED GASES

[75] Inventor: Abraham Vingerling, Zwijndrecht, Netherlands

[73] Assignee: N.V. Optische Industrie "De Oude Delft", Netherlands

[21] Appl. No.: 667,551

[22] Filed: Nov. 2, 1984

[30] Foreign Application Priority Data

Sep. 19, 1984 [NL] Netherlands ............ 8402872

[51] Int. Cl.⁴ ................................ B23K 9/32
[52] U.S. Cl. ................................ 219/147; 219/136; 350/584
[58] Field of Search ............ 219/147, 130.01, 136, 219/74, 124.34; 350/584

[56] References Cited

U.S. PATENT DOCUMENTS

| | | | |
|---|---|---|---|
| 2,945,943 | 7/1960 | Meyer | 219/147 |
| 4,240,691 | 12/1980 | Holmqvist et al. | 350/584 |
| 4,367,388 | 1/1983 | Ishihara et al. | 219/10.55 B |
| 4,450,339 | 5/1984 | Corby, Jr. | 219/124.34 |
| 4,491,715 | 1/1985 | Voronin et al. | 219/74 |

Primary Examiner—Clifford C. Shaw
Attorney, Agent, or Firm—Louis E. Marn

[57] ABSTRACT

A device and method for protecting optical means from contaminated gases, in which a substantially laminar flow of clean gas is passed over the surface of the optical means to be protected that is exposed to the contaminated gases.

15 Claims, 4 Drawing Figures

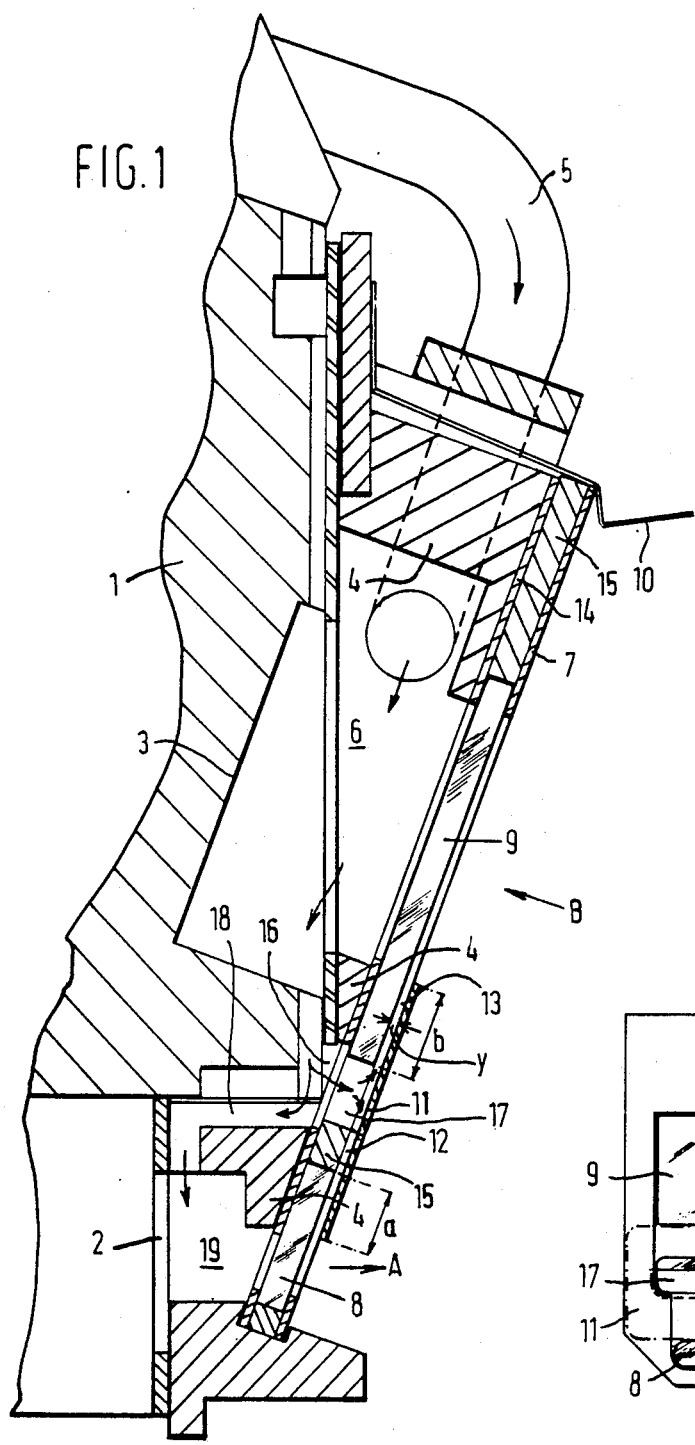
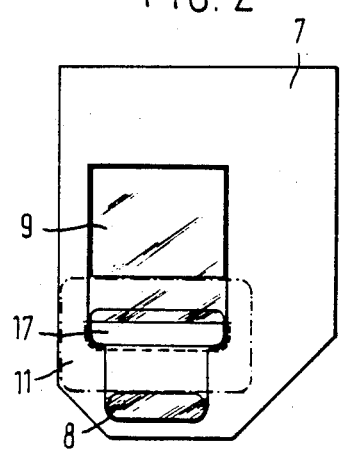

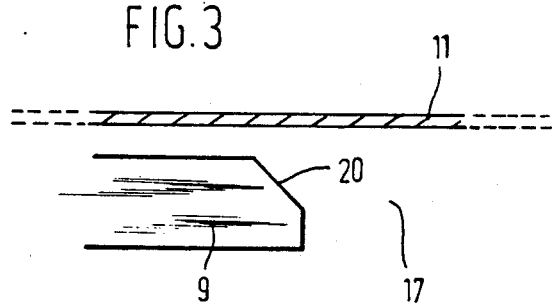
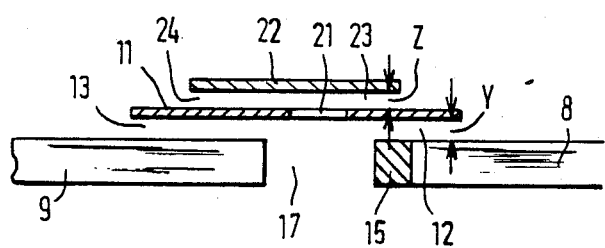

DEVICE AND METHOD FOR PROTECTING OPTICAL MEANS FROM CONTAMINATED GASES

The invention relates to a device and method for protecting optical means from contaminated gases.

The invention especially relates to a device and method for protecting optical means from contaminated gases in an automated welding process. In automated welding a detection device is disposed in very close proximity to the welding torch for scanning the profile of the surface to be welded immediately prior to the actual welding. The detection device is thus exposed to the contaminated gases and welding spatters released during welding. In a prior art automated welding apparatus the detection device comprises a laser source and optical means for collecting and detecting laser radiation reflected from the surface to be welded. The laser radiation exits the housing through a window and the reflected radiation enters the housing likewise through a window.

The windows can simply be protected from welding spatters by mechanical shielding. Without additional precautions, however, already in an early stage of the welding process the contaminated gases will cause such a deposit on the windows that the emitted and received radiation is seriously attenuated and even scattered, thereby prohibiting accurate detection.

It is an object of the invention to solve this problem by providing a method for protecting optical means from contaminated gases in which a substantially laminar flow of clean gas is passed over the surface of the optical means that is exposed to the contaminated gases. The invention further provides a device for protecting optical means from contaminated gases, especially in an automated welding process, which device comprises a chamber provided with a gas supply inlet, at least one opening through which light radiation can pass and a gas outlet; and a cover having a window adapted to be placed over the opening, which cover is provided with a slot-like inlet and a slit-like outlet, so that gas supplied from the gas supply inlet passes through the chamber and the gas outlet of the chamber and through the slot-like inlet and the slit-like outlet of the cover to flow in laminar fashion over the outer surface of the window.

It has appeared that the continuous passing of a laminar gas flow over the front of the optical means or over the outer surface of the window disposed in front of these optical means for the entire duration of the welding process permits the optical means or the window to remain free from objectionable deposits for a considerably longer period of time than possible if no such gas flow would be applied.

For achieving a laminar gas flow affording optimal protection of the entire window, it has appeared useful to have the slit-like gas outlet in the cover extend for a certain length along the front of the cover, with this outlet having a constant width over the distance from the slot-like gas inlet in the cover to the window, which width is equal to that of the window.

If the optical means emit radiation and receive reflected radiation through separate exit and entrance apertures in the detection device, self-evidently the protection device is provided with two openings for the emitted and received radiation respectively, and the cover is provided with two windows, the gas inlet in the cover being located intermediate these two windows and slit-like gas outlets extending from this gas inlet to adjacent the windows, with each of these outlets having a width equal to that of the associated window.

Embodiments of the invention will be described hereinafter with reference to the accompanying drawings, in which:

FIG. 1 shows a cross-sectional view of the protection device according to the invention;

FIG. 2 shows a top view of the cover of the device shown in FIG. 1;

FIG. 3 shows a detail of another embodiment of the device shown in FIGS. 1 and 2; and FIG. 4 shows a detail of yet another embodiment of the device shown in FIGS. 1 and 2.

In FIG. 1, reference numeral 1 designates a portion of the otherwise not shown housing of a detection device for automatically controlling a welding process, which detection device comprises a laser source likewise not shown. The housing 1 has an exit aperture 2 for laser radiation emitted into the direction of arrow A and an entrance aperture for radiation reflected into the direction of arrow B. To the housing 1 there is secured a body 4 having connected thereto a supply conduit 5 for a shielding gas such as compressed air or $CO_2$.

The body 4 has a cover 7 detachably mounted thereon, which cover 7 holds a glass window 8 for the emitted laser radiation and a glass window 9 for the reflected radiation. The cover is attached to the body 4 by means of a spring strip 10. The body 4 and the housing 1 together define a chamber 6 forming a buffer space for gas supplied through supply conduit 5, thereby ensuring a substantially constant pressure of the gas exiting body 4 to flow over windows 8 and 9 in spite of possible gas supply pressure variations. The inlet for the gas supplied through conduit 5 is located in a side wall of the chamber 6, so that the gas enters chamber 6 in a direction normal to the plane of the drawing. A proper equalisation of the gas flow through chamber 6 is thus achieved.

The direction of flow of the gas from supply conduit 5 through chamber 6 is schematically indicated in FIG. 1 by arrows. The windows 8 and 9 prevent vapours and oxides released during the welding process from reaching, through apertures 2 and 3, and polluting the optics of the laser source and of the means for collecting reflected radiation.

The outer surfaces of windows 8 and 9 rest on the inner surface of cover 7. A guide plate 11 is so mounted on the outer surface of cover 7 between windows 8 and 9 that slit-like outlets 12 and 13 are formed between the bottom face of this guide plate and the outer surfaces of windows 8 and 9 respectively, which outlets 12 and 13 have a height y and lengths a and b respectively. The height y is essentially equal to the thickness of the material of cover 7.

The windows 8 and 9 are secured to cover 7 by means of a fastening plate 14 resting on the inner surfaces of the two windows, while a spacer plate 15 of essentially the same thickness as the material of windows 8 and 9 is additionally provided between cover 7 and fastening plate 14.

A slot-like inlet 17 extends through fastening plate 14, spacer plate 15 and cover 7, which inlet 17 is in register with the outlet 16 in body 4 once the cover is mounted on body 4. Gas supplied through supply conduit 5 can thus flow through chamber 6, outlet 16 and slot-like inlet 17 to slit-like outlets 12 and 13.

As shown in FIG. 2, the slit-like outlets 12 and 13 in cover 7 are so formed that their widths are equal to the widths of windows 8 and 9 respectively over the respective distances from slot-like inlet 17 to the adjacent edges of the actual windows as defined by guide plate 11 and cover 7. It has appeared that this is an essential condition for the realisation of a laminar gas flow over the entire width of the window surface. This laminar gas flow prevents the aggressive gases and oxides from reaching the outer surfaces of windows 8 and 9 and hence prevents the formation of deposits on these windows for a long period of time during the welding process, which deposits would otherwise so attenuate and scatter the emitted laser beam and/or the reflected radiation that accurate detection is prohibited. Furthermore, optimal protection of each window requires a laminar gas flow having, on the one hand, insufficient strength for affecting the welding process and, on the other hand, sufficient strength for remaining laminar over the entire width as well as the entire length of the surface of the window.

As the gas flow should remain optimally laminar over the entire length of the surface of windows 8 and 9, the longer the windows the higher the demands imposed on the laminar character of the flow emerging from under guide plate 11. This means that the distance a may be less than the distance b.

It has appeared that proper laminar flow is achieved when the ratio between, on the one hand, the distance traversed by the gas flow between guide plate 11 and the respective one of windows 8 and 9 and, on the other hand, the width of the respective one of outlets 12 and 13, i.e. ratios a/y and b/y respectively, is in the range from 10 to 20. At higher ratios the pressure of the supplied gas is unnecessarily high for having the laminar gas flow extend over the entire window surface, whereas at smaller ratios the gas flow is insufficiently laminar.

The gas supplied through conduit 5 can flow through a channel 18 to a chamber 19 located in front of the exit aperture 2 for emitted laser radiation. During welding a slight overpressure is thus maintained both in chamber 6 and in chamber 19. This overpressure results in these chambers remaining free from dust, so that the emitted and received radiation is not adversely affected by dust.

FIG. 3 shows a detail, i.e. the situation at slot-like inlet 17, of another embodiment of the device shown in FIGS. 1 and 2. As shown in FIG. 3, the edge of window 9 at inlet 17 may be provided with a bevel 20 having a favourable effect on the formation of a laminar flow in outlet 13.

FIG. 4 shows a detail, i.e. again the situation at slot-like inlet 17, of yet another embodiment of the device shown in FIGS. 1 and 2, which embodiment is particularly useful when welding aluminum.

When welding aluminum, aluminum oxide will deposit on, inter alia, the top face of guide plate 11, especially on its edge where the laminar flow emerges from under the guide plate. It takes only a relatively brief period of time for the aluminum oxide to build up on this edge to such an extent that fragments break off and fall on the window. These fragments disturb the laminar flow as a region without laminar flow is formed downstream of the fragment fallen on the window, in which region aluminum oxide deposits on the window. This problem can be substantially eliminated by means of the embodiment shown in FIG. 4.

In this embodiment, the guide plate 11 is provided with a slot-like opening 21 opposite inlet 17. The width of the opening is preferably equal to the width of inlet 17. A second guide plate 22 is mounted above guide plate 11 at a small distance z therefrom, thus defining outlets 23 and 24. The distance z is on the order of distance y. Just as in outlets 12 and 13, a laminar flow is formed in outlets 23 and 24, which flow extends at least to the edge of guide plate 11. This laminar flow prevents aluminum oxide from depositing on the edges of guide plate 11. Breaking off of the deposit, if any, of aluminum oxide on the edges of the second guide plate 22 will result in fragments falling on guide plate 11 but not or only rarely on windows 8 and 9. Although such fragments disturb the laminar flow over guide plate 11, this has no direct effect on the laminar flow over windows 8 and 9. Consequently, when welding aluminum the useful life span of windows 8 and 9 in the embodiment of FIG. 4 is considerably longer than that of the windows in the embodiment of FIG. 1.

It will be clear that a large number of modifications is possible without exceeding the scope of the invention as defined by the embodiments described. For example, the slit-like outlets 12 and 13 may be formed, instead of by means of guide plate 11, by locally dishing cover 7 in a manner known in the art. Furthermore, instead of two windows 8 and 9 a single window may be provided through which both the emitted and the reflected radiation is passed.

I claim:

1. A method for protecting an optical member from contaminated gases, characterized in that a substantially laminar flow of clean gas is laterally passed over and across a surface of said optical member to be exposed to said contaminated gases, said substantially laminar flow of clean gas originating at only one side of said surface of said optical member and directed to an opposite side thereof.

2. An apparatus for protecting an optical member from contaminated gases, characterized by means for producing a substantially laminar flow of clean gas laterally over and across a surface of said optical member to be protected from said contaminated gases, said means for producing a substantially laminar flow including a gas inlet at only one side of said optical member for directing flow of clean gas to an opposite side thereof.

3. An apparatus for protecting an optical member from contaminated gases, which comprises: means for producing a clean gas, a chamber in fluid communication with said means for producing said clean gas, a slit-like channel having a discharge opening connected without material interruption to said optical member, said discharge opening of said slit-like channel being in fluid flow communication with said chamber, said slit-like channel being dimensioned in a direction normal to a direction of flow of clean gas substantially constant over a distance from upstream of said discharge opening to said discharge opening and being identical to a dimension of said discharge opening to produce a substantially laminar flow of clean gas over and across said optical member.

4. The apparatus according to claim 3 wherein said optical member is a window and wherein said chamber includes at least one opening through which light radiation can pass and a gas outlet and further including a cover for said window and adapted to be placed over said opening, said cover provided with a slot-like inlet along an inner surface thereof and a slit-like outlet communicating with said inlet and extending along an outer surface of said cover so that clean gas from said gas supply passes through said chamber and said gas outlet of said chamber and through said slot-like inlet to said slit-like outlet of said cover thereby to effect laminar flow over said surface of said window.

5. The assembly according to claim 4 wherein said cover is provided with a second slot-like inlet adjacent said first-named slot-like inlet, a width of said second slot-like inlet being substantially equal to that of said first-named slot-like inlet, and further including a guide plate mounted above said second slot-like inlet at a predetermined distance therefrom, said guide plates having a length smaller that a length of said slit-like outlet, so that a second slit-like outlet is provided between said cover and said guide plate.

6. The assembly according to claim 4 or 5 wherein said slit-like outlet extends a predetermined distance along said outer surface of said window, and wherein a width of said slit-like outlet is constant over an entire distance along said surface of said window and is essentially equal to a width of said window.

7. The assembly according to claim 6 wherein said window has an edge facing said slit-like outlet and is formed with a beveled portion extending towards said surface of said window.

8. The assembly according to claim 6 wherein a ratio between a distance defined by said slit-like outlet along said surface of said window to a height of said slit-like outlet is from 10 to 20.

9. The assembly according to claim 4 or 5 wherein said chamber is provided with two openings and said cover is provided with two windows adapted to be placed over said openings, said slot-like inlet in said cover being located intermediate said windows.

10. The assembly according to claim 9 wherein said slit-like outlets extend from said slot-like inlet along a portion of said surface of each of said windows, a width of each slit-like outlet being constant and equal to a width of an associated window.

11. The assembly according to claim 9 wherein said slit-like outlet extends a predetermined distance along said surface of said window, and wherein a width of said slit-like outlet is constant over an entire distance along said surface of said window and is essentially equal to a width of said window.

12. The assembly according to claim 11 wherein said window has an edge facing said slit-like outlet and is formed with a beveled portion extending towards said surface of said window.

13. The assembly according to claim 11 wherein a ratio between a distance defined by said slit-like outlet along said surface of said window to a height of said slit-like outlet is from 10 to 20.

14. The assembly according to claim 5 wherein said guide plate is provided with an opening located opposite to said slot-like inlet in said cover, and wherein a second guide plate is mounted above said first-named guide plate, said second guide plate defining a second pair of slit-like outlets.

15. The assembly according to claim 4 or 5 wherein said chamber is provided with channels for guiding said cleaning gas and for maintaining an overpressure at a front of said optical member.

* * * * *